Dec. 14, 1948.  C. G. STRANDLUND  2,456,465
CONVERTIBLE DISK PLOW
Filed Aug. 7, 1944  3 Sheets-Sheet 1
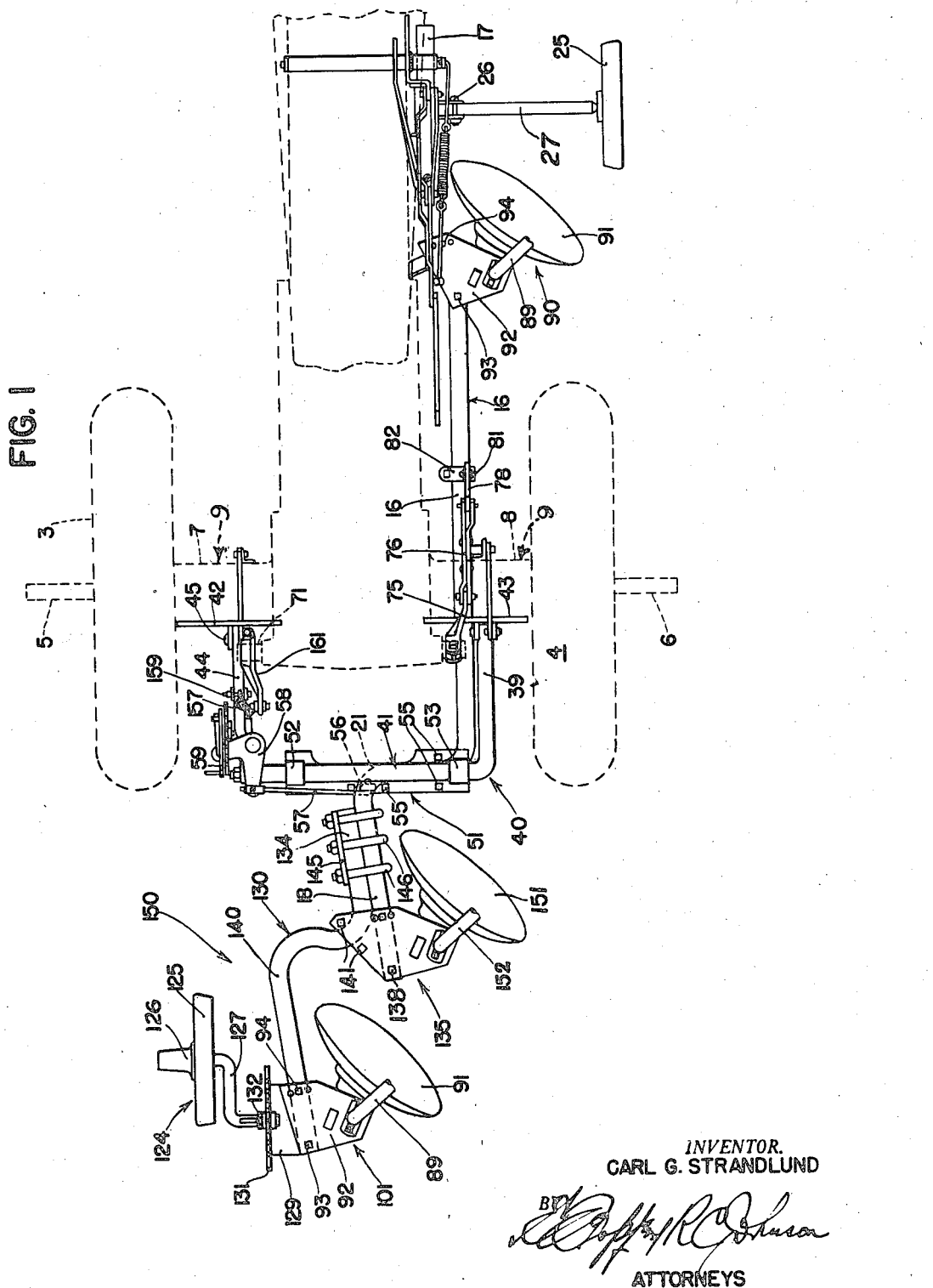
INVENTOR.
CARL G. STRANDLUND
BY
ATTORNEYS

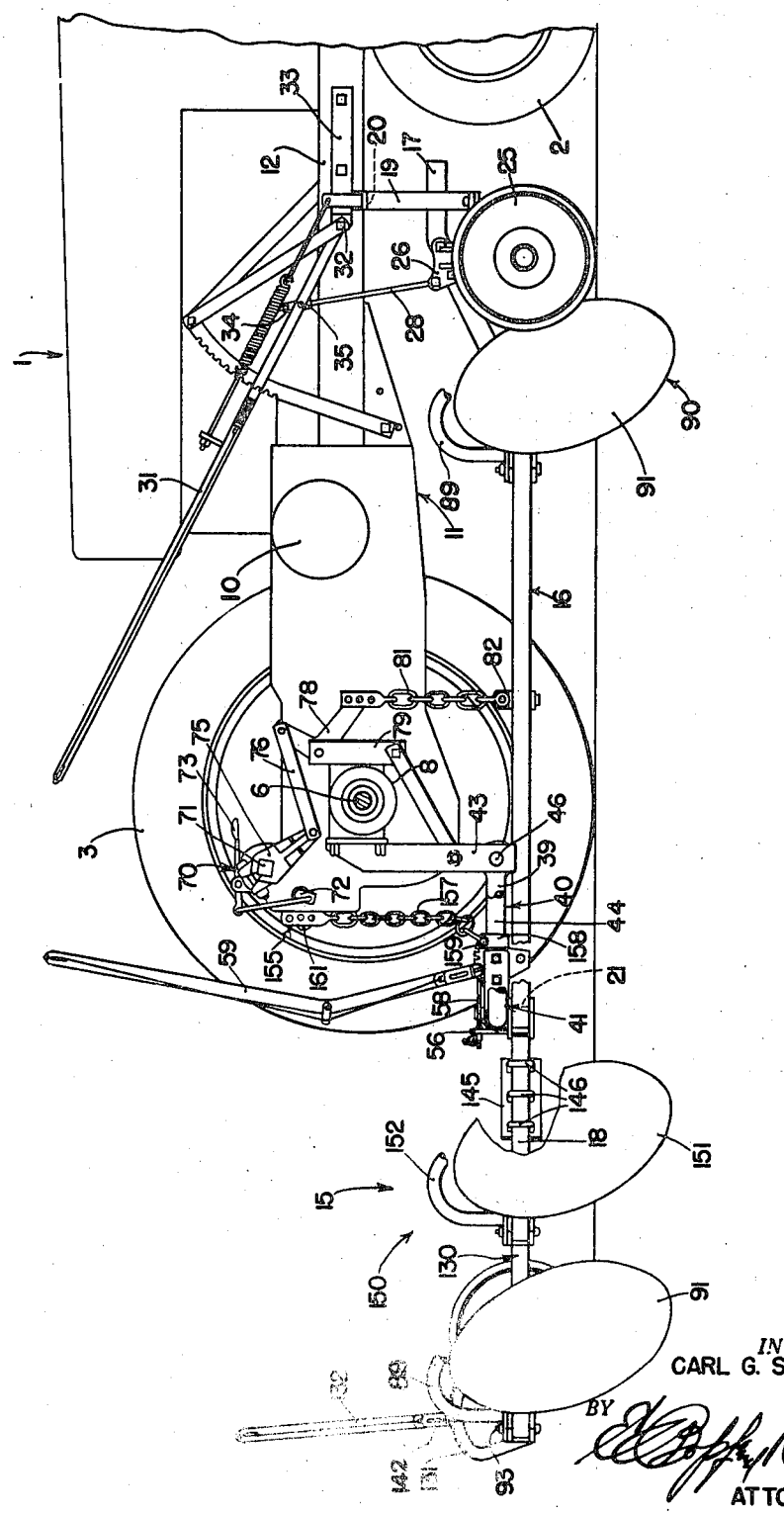

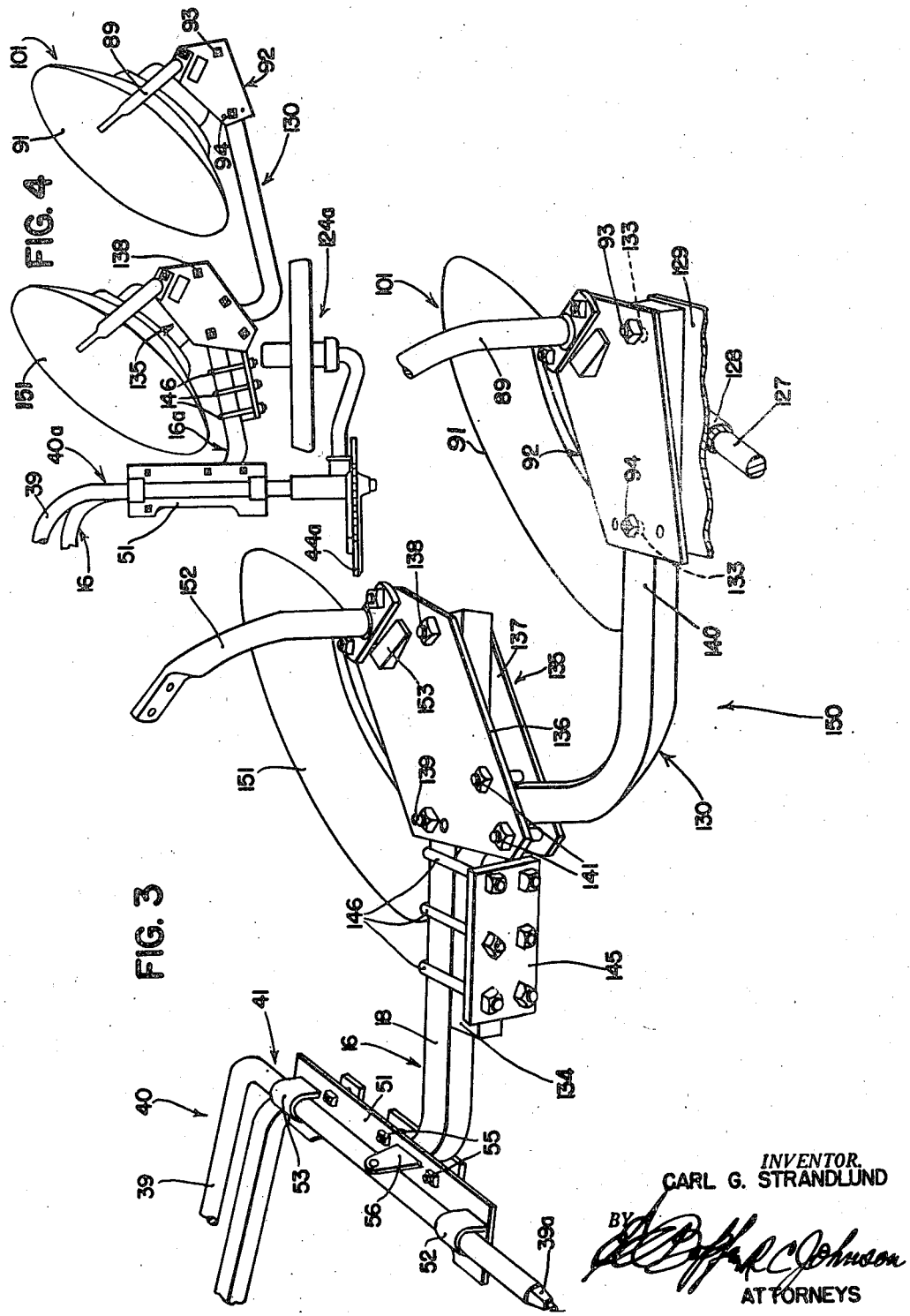

Patented Dec. 14, 1948

2,456,465

UNITED STATES PATENT OFFICE 2,456,465

CONVERTIBLE DISK PLOW

Carl G. Strandlund, Moline, Ill., assignor to Deere & Company, Moline, Ill., a corporation of Illinois Application August 7, 1944, Serial No. 548,418

6 Claims. (Cl. 97—53)

The present invention relates generally to agricultural implements and more particularly to earth working implements of the type carried by a tractor, more particularly a tractor of the type having a power lift unit connected with the implement for adjusting and/or lifting the same.

The object and general nature of the present invention is the provision of an auxiliary attachment for adding an earth working implement or other tool to the main implement for increasing the amount of work done per round of the outfit. More particularly, it is a feature of this invention to provide an auxiliary attachment that may easily and conveniently be connected to or removed from the main implement, and a further feature of this invention is the provision of auxiliary lifting means adapted especially for use when the auxiliary attachment is used so that the tractor power lift and/or other parts are not overloaded when the main implement and the auxiliary attachment are both lifted at the same time.

A further feature of the present invention is the provision of an auxiliary attachment for implements having a rear gauge wheel, the auxiliary attachment being especially constructed and arranged to receive the gauge wheel unit which is detachably connected with the main implement and to supply a tool to take the place of the tool that is removed with the gauge wheel.

These and other objects and advantages of the present invention will be apparent to those skilled in the art after a consideration of the following detailed description, taken in conjunction with the accompanying drawings in which the principles of the present invention have been illustrated.

In the drawings:

Figure 1 is a plan view of a disk plow in which the principles of the present invention have been incorporated.

Figure 2 is a side view of the plow shown in Figure 1.

Figure 3 is an enlarged fragmentary perspective view illustrating in particular the auxiliary attachment with which the present invention is particularly concerned.

Figure 4 is a fragmentary view of a modified form of the present invention.

Referring now more particularly to Figures 1 and 2, the auxiliary attachment, with which the present invention is most particularly concerned, is shown as an adjunct to an integral disk plow of the type shown in my prior United States Patent No. 2,339,225, dated January 11, 1944, to which particular attention is invited. The disk plow is shown as mounted on a tractor that is indicated in its entirety by the reference numeral 1. The tractor 1 is of the well-known tricycle type having front wheels 2 and rear wheels 3 and 4 secured, respectively, to axle shafts 5 and 6 mounted for rotation in extensions 7 and 8 of the tractor rear axle 9. The tractor 1 includes a source of power 10 mounted on or forming a part of the tractor frame 11, the latter including spaced apart side frame bars 12.

The disk plow above referred to is indicated in its entirety by the reference numeral 15 and includes a generally longitudinally extending main tool beam 16 having a front end 17 disposed in a vertically arranged guide 19 that is fixed in any suitable manner to the tractor 1. The guide 19 is provided with suitable stop means 20. The rear end of the beam 16 is bent to provide a laterally displaced section 18 connected to the main body of the beam by a generally transverse section 21. A guide wheel 25 is mounted adjacent the front end of the beam 16 and is supported for relative movement with respect to the latter by means of a bracket 26 fixed to the front end 17 of the beam and receives a bar 27 on which the guide wheel 25 is mounted. The downward movement of the front end 17 of the beam 16 is limited by means of a link 28 that is connected to one of the bolts fixing the bracket 26 to the beam 16, the link extending upwardly and having a sliding connection with a hand lever 31 pivoted, at 32, on a bracket 33 that is fixed to the side of the tractor. Preferably, the upper end of the link 28 carries a collar 34 which may be adjustably fixed to the link in any suitable position. The upper end of the link slides through a swivel 35 carried by the hand lever. The position of the hand lever determines the lowered position of the front 17 of the beam 16, but the front end of the beam 16 is free to rise vertically, up to the stop 20, as when raising the beam into a transport position, as will be explained below.

The tool beam 16 is connected with the tractor by draft and stabilizing connections indicated in their entirety by the reference numeral 40. Such connections include, first, a bail 41 pivoted to the lower ends of a pair of draft brackets 42 and 43. Preferably, the bail 41 includes an angled bar having a forwardly extending leg 39 at one side and at the other side a squared end 39a to which the rear end of a left hand bail arm 44 is connected. The forward end of the bail arm 44 is apertured to receive a pivot 45 which connects the left portion of the bail 41 to the left draft bracket 42, and the forward end of the bail end 39 is apertured to receive a pivot 46 that connects the right side of the bail 41 to the right draft bracket 43. A mounting plate or bracket 51 is provided with a pair of U-shaped clips 52 and 53, the ends of which are welded or otherwise fixed to the plate 51 and embrace the central portion of the bail 41. The plate 51 is provided with a plurality of bolt holes to receive bolts 55 which rigidly secure the plate or bracket 51 to the laterally directed section 21 of the rear end of the main beam 16. A lug 56 fixed to the bracket 51 is apertured to receive a link 57, and the other end of the link is pivotally connected to a bell crank 58 swingably mounted on the left bail arm 44, and a hand lever 59 is also mounted on the bail 40 and is operatively connected to swing the bell crank 58 and shift the bracket 51 and the rear end of the beam 16 laterally so as to vary the width of cut.

The tractor 1 is equipped with a power lift unit indicated in its entirety by the reference numeral 70. The power lift unit 70 is hydraulically operated by power derived from the tractor motor and includes a power lift rockshaft 71 controlled by valve mechanism 72 that may be operated by a foot pedal 73. Power lift apparatus of this kind is disclosed and claimed in the United States Patent No. 2,302,637, dated November 17, 1942, to E. McCormick et al., to which reference may be made if necessary. An arm 75 is connected to the right end of the power lift rockshaft 71 and has pivoted thereto a link 76 which at its forward end is pivoted to a bell crank 78 that is mounted on the upper end of a bracket 79 fixed to the right rear axle extension 8. The bell crank 78 is connected by a chain 81 to a clip 82 that is secured to the intermediate portion of the beam 16, the chain and bell crank just described being positioned generally forwardly of the rear axle of the tractor, as will be clear from Figure 2. When the operator steps on the foot pedal 73, the power lift mechanism acts to rock the rockshaft 71 in a direction to swing the arm 75 rearwardly, thus exerting a raising action through the chain 81 against the tool beam 16. The parts are so arranged that the first action of the power lift is to raise the front end 17 of the main beam 16 against the stop 20, thereafter lifting the rear end of the beam into a raised or transport position, together with the tools associated therewith.

According to the invention disclosed and claimed in my prior patent identified above, the tool beam 16 carries a front tool in front of the tractor rear axle and a rear tool, substantially identical with the front tool, rearwardly of the rear axle. In Figures 1 and 2, the front tool is indicated by the reference numeral 90 and comprises a disk furrow opener 91 mounted for rotation by suitable bearing means on an attaching bracket 92 bolted or otherwise fixed to the front portion of the beam 16. A standard 89 is carried by the bracket means 92 and is arranged to receive a scraper (not shown) which may be of any suitable construction. The bracket 92 is connected to the beam 16 by a pivot bolt 93 and by a front bolt 94 which is disposed in an opening in the front portion of the beam 16 and in any one of a plurality of openings formed in the plates making up the bracket 92. By placing the bolt 94 in one or the other of the openings in the bracket the angle of the disk furrow opener 91 may be adjusted. The rear tool unit, indicated in its entirety by the reference numeral 101, is of substantially the same construction, so far as the furrow opener and associated parts are concerned, and hence the same reference numerals have been employed. In addition, however, the rear tool unit 101 includes a rear gauge means indicated in its entirety by the refence numeral 124. The gauging unit 124 includes a gauge wheel 125 mounted at the rear of the tractor alongside the rear furrow opener and is fixed to a bearing member 126 mounted on the laterally outer end of a gauge wheel crank axle 127. The inner end of the latter is received in a sleeve 128 supported on the underside of a plate 129 which preferably is secured to the rear end 18 of the beam 16, preferably by the same bolts 93 and 94 that fix the rear bracket 82 thereto. The plate 129 carries a toothed sector 131 with which detent mechanism 142 on a hand lever 132 cooperates. The hand lever 132 is fixed to the crank axle 127, and by releasing the hand lever from the sector 131 and swinging the gauge wheel crank axle 127, the gauge wheel 125 may be raised or lowered to adjust the depth of operation of the rear tool. The depth of operation of the front tool is, as described above, controlled by the position of the hand lever 31.

The structure so far described corresponds generally to the structure disclosed in my prior patent identified above. The principal feature of the present invention is the provision of an extension attachment for an implement of this kind in which it is possible to add a third tool to the implement and thus work a wider strip of ground at each round. The extension attachment comprises, generally speaking, an extension adapted to be fixed to the rear end of the beam 16 and an auxiliary furrow opener to take the place of the furrow opener 101 and gauge wheel unit 124 described above, with the auxiliary beam provided with means to receive the rear furrow and its associated gauge wheel unit 124, these parts being normally detachably associated with the rear end of the main beam 16, as described and as disclosed in my prior patent.

The auxiliary or extension attachment comprises a generally Z-shaped tool beam 130 comprising a forward end 134 and a rear portion 140 provided with a pair of openings 133. An attaching bracket 135, comprising a pair of plates 136 and 137, is apertured to receive a pair of bolts 138 and 139. When the rear furrow wheel unit 101 and the gauge wheel unit 124 are removed from the rear end of the main beam 16, as by detaching the bolts 93 and 94, the bolt 138 may be placed in the rear opening in the beam 16 and the bolt 139 placed in one of the other of the openings in the bracket plates and in an opening in the rear end portion of the beam 16, thus mounting the bracket 135 on the rear end of the beam 16 in practically exactly the same location as the furrow wheel unit 101 and its bracket 92 are normally mounted. The bracket 135 is different from the bracket 92 in that the upper and lower plates 136 and 137 are extended over and are attached to the bent generally central portion of the auxiliary beam 130, being apertured to receive a pair of clamping bolts 141 by which the bracket 135 normally is mounted on the auxiliary beam 130 and, in general, forms a part of the auxiliary unit of which the beam 130 is a part. To secure the front end of the auxiliary beam 130 to the rear end 18 of the main beam 16, I provide a clamping plate 145 having a number of apertures therein to receive a plurality of clamping U-bolts 146 which, when placed around the rear end of the beam 18 and tightened, serve to securely fix the front end of the auxiliary beam 130 to the rear end of the main beam 16. Since the bracket 135 is bolted, as at 141, to the laterally bent part of the auxiliary beam, it will be seen that the bolts 138 materially aid in holding the auxiliary beam 130 against rearward displacement relative to the beam 16, particularly in the event the U-bolts 146 become loose.

The auxiliary attachment, which is indicated in its entirety by the reference numeral 150, also includes a disk furrow opener 151 mounted by suitable bearing means on the bracket 135, and the latter is equipped with a standard 152 to which a scraper (not shown) may be attached. Preferably, the bearing means by which the disk 151 is mounted, are carried at the lower end of a standard 153, the upper end of which is secured, as by welding, to the bracket plates 136 and 137, this being substantially the same as the attachment construction for the front tool 90 and the rear tool 101. The bolt holes 133 are spaced so as to accommodate the attachment of the rear tool unit 101 and the gauge wheel unit 124 to the rear end of the extension beam 130, as indicated in Figures 3 and 4.

Since the addition of the extension beam 130 and the auxiliary furrow opener that forms a part thereof adds appreciable weight to the rear end of the beam 16, it may be necessary under certain conditions to protect the tractor power lift from overload by providing an auxiliary lifting attachment between the rear end of the bear, rearwardly of the rear axle of the tractor, and the end of the power life rockshaft 71 opposite the arm 75. The auxiliary lifting attachment is indicated in its entirety by the reference numeral 155 and includes a chain 157 which at its lower end is connected by a clip 158 to the left arm 44 of the bail 40 by means of a U-bolt 159, and the upper end of the chain 157 is connected by a clevis or the like to the outer end of an auxiliary lifting arm 161 suitably fixed to the left end of the power lift shaft 71. Preferably, the arm 161 is substantially identical with the arm 75 mentioned above. The arm 161 extends generally rearwardly and the chain 157 is disposed rearwardly of the tractor rear axle, and in operation, as will be clear from Figure 2, when the power lift shaft 71 is rocked in a forward direction the arm 161 is swung upwardly and exerts a direct lifting action through the chain 157 against the bail 40, thus augmenting the lifting action performed by the upward rocking of the forward bell crank 78. This makes more nearly uniform the loads imposed on the tractor power lift, particularly since the auxiliary lifting unit 155 is connected fairly close to the auxiliary tool beam and associated parts that are connected to the rear end of the main beam 16.

In one form of the invention shown in prior patent identified above, the gauge wheel was mounted rigidly with respect to the bail, instead of being swingably mounted on the rear bracket as shown in Figure 1. The present auxiliary beam and bracket arrangement is admirably adapted to be used with an implement where the gauge wheel is rigidly mounted on the bracket, and this arrangement is shown in Figure 4, wherein the gauge wheel unit 124a is shown as a part of the bail 40a. Like the construction described above, in this form the bracket 135 is connected by the bolt 138 to the rear end of the main beam 16a to which the front end of the extension beam 130 is connected by the U-bolts 146.

While I have shown and described above the preferred structure in which the principles of the present invention have been incorporated, it is to be understood that my invention is not to be limited to the details shown and described above, but that, in fact, widely different means may be employed in the practice of the broader aspects of my invention.

What I claim, therefore, and desire to secure by Letters Patent is:

1. A convertible plow having a beam, a furrow opener adapted to be detachably connected with one end of the beam, an auxiliary beam having at its forward end a forwardly disposed portion and a laterally disposed portion, means on said auxiliary beam for receiving said furrow opener, an auxiliary furrow opener and furrow opener bracket attachable to the rear end of said first beam in place of said first mentioned furrow opener, means for attaching the forwardly disposed portion of said auxiliary beam to the rear end portion of said first beam forward of the rear end thereof, after said first mentioned furrow opener has been removed therefrom, said auxiliary furrow bracket including a laterally extended section, and means for connecting the auxiliary furrow opener bracket to the rear portion of said first beam and the laterally extended section of said auxiliary furrow opener bracket to the laterally disposed portion at the front end of said auxiliary beam.

2. In a convertible plow of the type having a main beam and an extension beam, attaching means for detachably connecting said extension beam to said main beam forward of the rear end of said main beam, a detachable furrow opener unit comprising bracket means, means engageable with both of said beams for detachably connecting said bracket means with both of said beams rearwardly of said attaching means when one beam is connected to the other beam, and a furrow opener carried by said bracket means.

3. In a plow having a generally longitudinally extending beam and a furrow opener and bracket therefor comprising a pair of plates adapted to receive the rear end of said beam and means for detachably connecting said plates to the rear end of said beam, an attachment comprising an auxiliary beam, means for connecting the front end of said auxiliary beam to said first mentioned beam forward of the rear end thereof, a second furrow opener, bracket means therefor comprising a pair of plates adapted to be connected to the rear end of said first beam rearwardly of said attaching means and said plates being extended over the adjacent portion of said auxiliary beam, means for connecting said extended bracket portions to said auxiliary beam, and means on the rear end of the latter to receive the bracket plates of said first mentioned furrow opener.

4. The invention set forth in claim 3, further characterized by the rear end of each of said main and auxiliary beams having a pair of longitudinally spaced openings therein, and bolt means extending through both pairs of said bracket plates and said openings for connecting both of said furrow openers to said beams.

5. The invention set forth in claim 3, further characterized by the extended portions of said plates being secured to said auxiliary beam so as to prevent displacement thereof relative to said main beam in a generally fore and aft direction.

6. In a plow having a generally longitudinally extending beam and a furrow opener and bracket therefor comprising a pair of plates adapted to receive the rear end of said beam and means for detachably connecting said bracket to the rear portion of said beam, an attachment comprising an auxiliary beam, means for connecting the front end of said auxiliary beam to said first mentioned beam, a second furrow opener, bracket means therefor adapted to be connected to the rear end of said first beam rearwardly of said attaching means and including means engaging the adjacent portion of said auxiliary beam so as to prevent the displacement thereof relative to said main beam in a generally fore and aft direction, and means on the rear end of said auxiliary beam to receive said first mentioned bracket and furrow opener.

CARL G. STRANDLUND.

REFERENCES CITED

The following references are of record in the file of this patent:

UNITED STATES PATENTS

| Number | Name | Date |
|---|---|---|
| 705,337 | Gatling | July 22, 1902 |
| 719,696 | Sanders | Feb. 3, 1903 |
| 801,168 | Weeks | Oct. 3, 1905 |
| 830,341 | Lindgren | Sept. 4, 1906 |
| 881,797 | Hardy | Mar. 10, 1908 |
| 1,148,420 | Wihs et al. | July 27, 1915 |
| 1,230,339 | Sweet | June 19, 1917 |
| 1,399,301 | Hist | Dec. 6, 1921 |
| 1,834,227 | Strandlund et al | Dec. 1, 1931 |
| 1,846,652 | Paul | Feb. 23, 1932 |
| 1,861,667 | Seaholm | June 7, 1932 |
| 2,085,633 | Cary | June 29, 1937 |
| 2,140,144 | Silver | Dec. 13, 1938 |

FOREIGN PATENTS

| Number | Country | Date |
|---|---|---|
| 209,245 | Germany | Apr. 26, 1909 |